US011126111B2

(12) United States Patent
Tomura et al.

(10) Patent No.: US 11,126,111 B2
(45) Date of Patent: Sep. 21, 2021

(54) TONER AMOUNT DETECTOR, TONER AMOUNT DETECTION METHOD, AND NON-TRANSITORY STORAGE MEDIUM STORING PROGRAM

(71) Applicants: Yuusuke Tomura, Kanagawa (JP); Masashi Hommi, Kanagawa (JP); Tetsuya Hara, Tokyo (JP); Yuki Osato, Tokyo (JP); Yuji Ieiri, Kanagawa (JP); Takumi Miyagawa, Kanagawa (JP)

(72) Inventors: Yuusuke Tomura, Kanagawa (JP); Masashi Hommi, Kanagawa (JP); Tetsuya Hara, Tokyo (JP); Yuki Osato, Tokyo (JP); Yuji Ieiri, Kanagawa (JP); Takumi Miyagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/841,725

(22) Filed: Apr. 7, 2020

(65) Prior Publication Data
US 2020/0333725 A1 Oct. 22, 2020

(30) Foreign Application Priority Data
Apr. 17, 2019 (JP) .............................. JP2019-078873

(51) Int. Cl.
*G03G 15/08* (2006.01)
*G01F 23/24* (2006.01)
*G01F 23/26* (2006.01)

(52) U.S. Cl.
CPC ......... *G03G 15/086* (2013.01); *G01F 23/242* (2013.01); *G01F 23/266* (2013.01)

(58) Field of Classification Search
CPC ............. G03G 15/086; G03G 15/0856; G03G 15/0865; G03G 21/12; G01F 23/242; G01F 23/263; G01F 23/266
See application file for complete search history.

(56) References Cited

U.S. PATENT DOCUMENTS 3,520,445 A * 7/1970 Hansen ................ G03G 15/086
222/23
4,133,453 A * 1/1979 Ohbora ................ G01F 23/263
222/39

(Continued)

FOREIGN PATENT DOCUMENTS

JP 11-272060 10/1999
JP 2006-146007 6/2006

(Continued)

*Primary Examiner* — David J Bolduc
(74) *Attorney, Agent, or Firm* — Oblon, McClelland, Maier & Neustadt, L.L.P.

(57) ABSTRACT

A toner amount detector detects an amount of toner in a toner bottle. The toner amount detector includes at least one pair of electrodes disposed opposite each other via the toner bottle, grounding members disposed outboard of the at least one pair of electrodes and electrically grounded, circuitry to switch a first detection processing and a second detection processing, and an indicator to indicate that a positional deviation of the at least one pair of electrodes has occurred. The grounding members face the at least one pair of electrodes. The first detection processing detects the amount of toner based on a first capacitance between the at least one pair of electrodes, and the second detection processing detects a positional deviation based on a second capacitance between each of the grounding members and a corresponding one of the at least one pair of electrodes.

20 Claims, 8 Drawing Sheets

(56) References Cited

U.S. PATENT DOCUMENTS

| | | | | |
|---|---|---|---|---|
| 4,449,405 A * | 5/1984 | Franz | G01F 23/263 | 324/690 |
| 5,465,619 A * | 11/1995 | Sotack | G01F 23/265 | 118/694 |
| 5,500,714 A * | 3/1996 | Yashiro | G03G 21/1832 | 399/111 |
| 5,878,309 A * | 3/1999 | Nomura | G03G 21/1857 | 399/111 |
| 5,987,269 A * | 11/1999 | Allen | G03G 15/086 | 399/27 |
| 6,035,150 A * | 3/2000 | Domon | G03G 15/0856 | 399/254 |
| 6,169,865 B1 * | 1/2001 | Miyabe | G03G 15/0896 | 399/111 |
| 6,253,036 B1 * | 6/2001 | Karakama | G03G 21/1814 | 399/119 |
| 6,397,018 B1 * | 5/2002 | Matsumoto | G03G 21/1867 | 399/27 |
| 6,472,887 B1 * | 10/2002 | Tullis | G01F 23/263 | 324/662 |
| 6,775,487 B2 * | 8/2004 | Kakeshita | G03G 21/1889 | 399/27 |
| 8,036,544 B2 * | 10/2011 | Toda | G03G 15/0856 | 399/27 |
| 8,891,983 B2 * | 11/2014 | Tamagaki | G03G 15/086 | 399/35 |
| 9,109,939 B2 * | 8/2015 | Ahne | G01F 23/266 | |
| 9,366,994 B2 * | 6/2016 | Shinohara | G03G 15/0891 | |
| 2001/0021314 A1 * | 9/2001 | Hibi | G03G 15/086 | 399/27 |
| 2001/0038758 A1 * | 11/2001 | Oguma | G03G 15/086 | 399/27 |
| 2001/0043814 A1 * | 11/2001 | Abe | G03G 15/0891 | 399/27 |
| 2002/0009303 A1 * | 1/2002 | Matsumoto | G03G 15/086 | 399/27 |
| 2002/0012542 A1 * | 1/2002 | Karakama | G03G 21/1867 | 399/27 |
| 2002/0021908 A1 * | 2/2002 | Matsumoto | G03G 15/086 | 399/27 |
| 2002/0025177 A1 * | 2/2002 | Yokoi | G03G 21/1814 | 399/27 |
| 2002/0159780 A1 * | 10/2002 | Chadani | G03G 21/1814 | 399/27 |
| 2002/0172521 A1 * | 11/2002 | Oguma | G03G 15/086 | 399/27 |
| 2003/0016955 A1 * | 1/2003 | Hiratsuka | G03G 15/0856 | 399/27 |
| 2003/0123888 A1 * | 7/2003 | Naito | G03G 15/0856 | 399/27 |
| 2003/0180061 A1 * | 9/2003 | Oguma | G03G 21/1867 | 399/27 |
| 2006/0008287 A1 * | 1/2006 | Noda | G03G 21/1871 | 399/90 |
| 2007/0003305 A1 * | 1/2007 | Verheijen | G03G 15/0907 | 399/55 |
| 2007/0065166 A1 * | 3/2007 | Takiguchi | G03G 15/556 | 399/35 |
| 2008/0069576 A1 * | 3/2008 | Etter | G03G 15/086 | 399/35 |
| 2010/0028025 A1 * | 2/2010 | Yoshida | G03G 15/0875 | 399/12 |
| 2011/0069978 A1 * | 3/2011 | Yamamoto | G03G 15/0856 | 399/27 |
| 2011/0298855 A1 | 12/2011 | Ieiri | | |
| 2012/0121275 A1 * | 5/2012 | Kanai | G03G 15/086 | 399/27 |
| 2013/0033719 A1 | 2/2013 | Ieiri | | |
| 2013/0266329 A1 * | 10/2013 | Otani | G03G 15/086 | 399/27 |
| 2013/0308965 A1 * | 11/2013 | Tsuchiya | G03G 15/0856 | 399/27 |
| 2014/0023385 A1 * | 1/2014 | Hosoya | G03G 15/0856 | 399/27 |
| 2014/0037305 A1 * | 2/2014 | Monde | G03G 15/086 | 399/27 |
| 2015/0174896 A1 | 6/2015 | Ieiri | | |
| 2016/0136947 A1 | 5/2016 | Hommi | | |
| 2017/0270395 A1 | 9/2017 | Tanaka et al. | | |
| 2018/0227150 A1 | 8/2018 | Kemmochi et al. | | |
| 2019/0187585 A1 * | 6/2019 | Tonges | G01F 23/263 | |
| 2019/0196360 A1 | 6/2019 | Inokuchi et al. | | |
| 2020/0033752 A1 | 1/2020 | Kubo et al. | | |

FOREIGN PATENT DOCUMENTS

| | | |
|---|---|---|
| JP | 2018-066789 | 4/2018 |
| JP | 2020-020888 | 2/2020 |

* cited by examiner

TONER AMOUNT DETECTOR, TONER AMOUNT DETECTION METHOD, AND NON-TRANSITORY STORAGE MEDIUM STORING PROGRAM

CROSS-REFERENCE TO RELATED APPLICATION

This patent application is based on and claims priority pursuant to 35 U.S.C. § 119(a) to Japanese Patent Application No. 2019-078873, filed on Apr. 17, 2019, in the Japan Patent Office, the entire disclosure of which is hereby incorporated by reference herein.

BACKGROUND

Technical Field

Embodiments of the present disclosure relate to a toner amount detector, a toner amount detection method, and a non-transitory storage medium storing a program for performing the toner amount detection method.

Description of the Related Art

In certain image forming apparatuses that form and output a toner image on a sheet of recording media, a pair of electrodes are provided so as to sandwich a toner bottle installed in the image forming apparatus. A change in capacitance between the pair of electrodes is detected to measure an amount of toner remaining in the toner bottle.

SUMMARY

Embodiments of the present disclosure describe an improved toner amount detector configured to detect an amount of toner in a toner bottle. The toner amount detector includes at least one pair of electrodes disposed opposite each other via the toner bottle, grounding members disposed outboard of the at least one pair of electrodes and electrically grounded, circuitry configured to switch between a first detection processing and a second detection processing, and an indicator configured to indicate that a positional deviation of the at least one pair of electrodes has occurred. The grounding members face the at least one pair of electrodes. The first detection processing detects the amount of toner based on a first capacitance between the at least one pair of electrodes, and the second detection processing detects the positional deviation based on a second capacitance between each of the grounding members and a corresponding one of the at least one pair of electrodes.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views, and redundant descriptions are omitted or simplified.

DETAILED DESCRIPTION

Hereinafter, a description is given of a toner amount detector, a toner amount detection method, and a non-transitory storage medium storing a program for performing the toner amount detection method according to an embodiment of the present disclosure, with reference to the drawings.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

Figure 1:
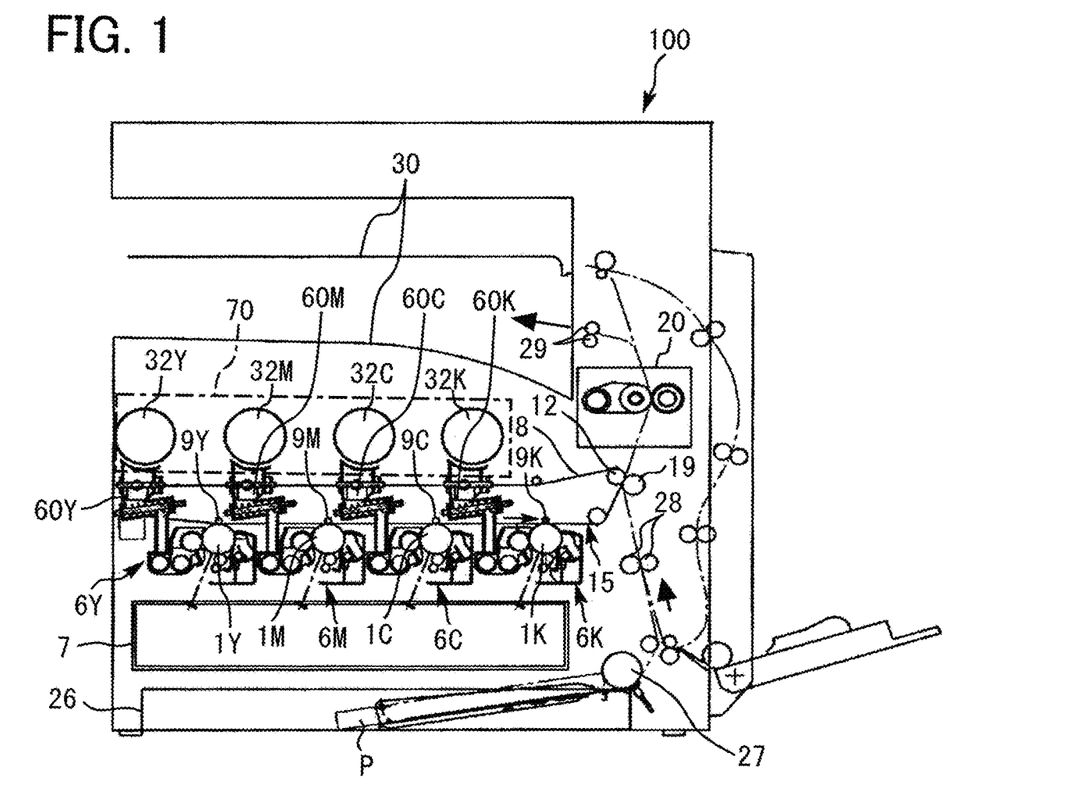
FIG. 1 is a schematic view illustrating a configuration of an image forming apparatus according to an embodiment of the present disclosure.

FIG. 1 is a schematic view of a printer 100 as an example of an image forming apparatus according to an embodiment of the present disclosure.

The printer 100 includes a toner bottle mount 70. Four toner bottles 32Y, 32M, 32C, and 32K (also collectively referred to as the "toner bottles 32") to contain yellow, magenta, cyan, and black toners, respectively, are removably installed in the toner bottle mount 70. An intermediate transfer unit 15 is disposed below the toner bottle mount 70. Four image forming units 6Y, 6M, 6C, and 6K (also collectively referred to as the "image forming units 6") are arranged in parallel, facing an intermediate transfer belt 8 of the intermediate transfer unit 15, to form yellow, magenta, cyan, and black (Y, M, C, and K) toner images, respectively.

Toner supply devices 60Y, 60M, 60C, and 60K (also collectively referred to as the "toner supply devices 60") are disposed below the toner bottles 32Y, 32M, 32C, and 32K, respectively. The toner supply devices 60Y, 60M, 60C, and 60K supply toner contained in the toner bottles 32Y, 32M, 32C, and 32K to the image forming units 6Y, 6M, 6C, and 6K, respectively.

The four toner bottles 32Y, 32M, 32C, and 32K, the four image forming units 6Y, 6M, 6C, and 6K, and the four toner supply devices 60Y, 60M, 60C, and 60K have similar configurations except for the color of toner used therein. Accordingly, in the descriptions and drawings below, the suffixes Y, M, C, and K, each representing the color of toner, are omitted unless color discrimination is necessary. For other units, the suffix indicating the color of the toner may be omitted.

Figure 2:
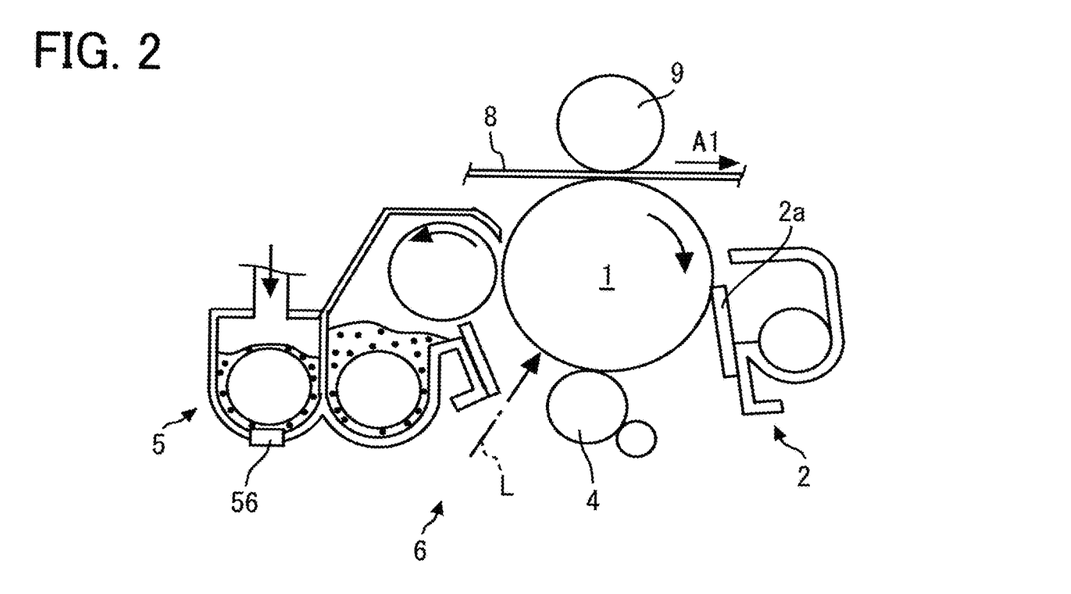
FIG. 2 is a schematic view illustrating a configuration of an image forming unit of the image forming apparatus in FIG. 1.

FIG. 2 is a schematic view illustrating a configuration of the image forming unit 6. Each image forming unit 6 includes a photoconductor 1, and further includes a charging device 4, a developing device 5, a cleaning device 2, a discharger, and the like disposed around the photoconductor 1. Image forming processes, namely charging, exposure, development, transfer, and cleaning processes, are performed on the photoconductor 1, and thus a toner image of each color is formed on the photoconductor 1.

The photoconductor 1 is rotated clockwise in FIG. 2, driven by a drive motor. At the charging device 4, a surface of the photoconductor 1 is uniformly charged (charging process). When the surface of the photoconductor 1 reaches a position where the surface of the photoconductor 1 is irradiated with a laser beam L emitted from an exposure device 7 (see FIG. 1), the photoconductor 1 is scanned with the laser beam L, and thus an electrostatic latent image for each color is formed thereon (exposure process). Then, the surface of the photoconductor 1 reaches a position opposite the developing device 5, where the electrostatic latent image is developed with toner into the toner image for each color (development process). At a primary transfer position at which the photoconductor 1 is opposed to a primary transfer roller 9 via the intermediate transfer belt 8, the toner image on the photoconductor 1 is transferred onto the intermediate transfer belt 8 (primary transfer process). The respective toner images formed on the photoconductors 1Y, 1M, 1C, and 1K (see FIG. 1) are sequentially transferred onto the intermediate transfer belt 8, thereby forming a multicolor toner image on the intermediate transfer belt 8.

When the surface of the photoconductor 1 after the primary transfer process reaches a position opposite the cleaning device 2, a cleaning blade 2a of the cleaning device 2 mechanically collects untransferred toner remaining on the photoconductor 1 (cleaning process). Subsequently, the surface of the photoconductor 1 from which the untransferred toner is collected reaches a position opposite the discharger, and the discharger removes any residual potential on the photoconductor 1.

With reference to FIG. 1, it can be seen that the intermediate transfer unit 15 includes the intermediate transfer belt 8, four primary transfer rollers 9Y, 9M, 9C, and 9K, a secondary-transfer backup roller 12, multiple tension rollers, and a belt cleaning device. The intermediate transfer belt 8 is entrained and supported by the above-described multiple rollers including the secondary-transfer backup roller 12 and is rotated counterclockwise in FIG. 1 as the secondary-transfer backup roller 12 rotates. The four primary transfer rollers 9Y, 9M, 9C, and 9K are pressed against the corresponding photoconductors 1Y, 1M, 1C, and 1K, respectively, via the intermediate transfer belt 8 to form primary transfer nips.

A primary-transfer bias opposite in polarity to the toner is applied to the primary transfer rollers 9Y, 9M, 9C, and 9K. The intermediate transfer belt 8 rotates in the direction indicated by arrow A1 in FIG. 2 and sequentially passes through the primary transfer nips of the primary transfer rollers 9Y, 9M, 9C, and 9K. Then, the single-color toner images on the photoconductors 1Y, 1M, 1C, and 1K are primarily transferred to and superimposed on the intermediate transfer belt 8, thereby forming the multicolor toner image.

The intermediate transfer belt 8 carrying the multicolor toner image reaches a position opposite a secondary transfer roller 19 illustrated in FIG. 1. The secondary-transfer backup roller 12 and the secondary transfer roller 19 press against each other via the intermediate transfer belt 8, and the contact portion therebetween is hereinafter referred to as a secondary transfer nip. The multicolor toner image on the intermediate transfer belt 8 is transferred onto a recording medium P such as a transfer sheet transported to the secondary transfer nip (secondary transfer process). Then, untransferred toner is collected from the intermediate transfer belt 8 by the belt cleaning device to complete a series of transfer processes performed on the intermediate transfer belt 8.

The recording medium P is transported from a sheet feeder 26 disposed in a lower portion of the printer 100 to the secondary transfer nip via a sheet feeding roller 27 and a registration roller pair 28.

The recording medium P onto which the multicolor toner image is transferred at the secondary transfer nip is transported to a fixing device 20. In the fixing device 20, a fixing belt and a pressure roller apply heat and pressure to the recording medium P to fix the multicolor toner image on the recording medium P. Subsequently, the recording medium P is ejected by an output roller pair 29 outside the printer 100. The ejected recording media P are sequentially stacked as output images on a stack tray 30. Thus, a sequence of image forming processes performed in the printer 100 is completed.

Next, the toner supply device 60 and the toner bottle 32 are described in detail.

Figure 3A:
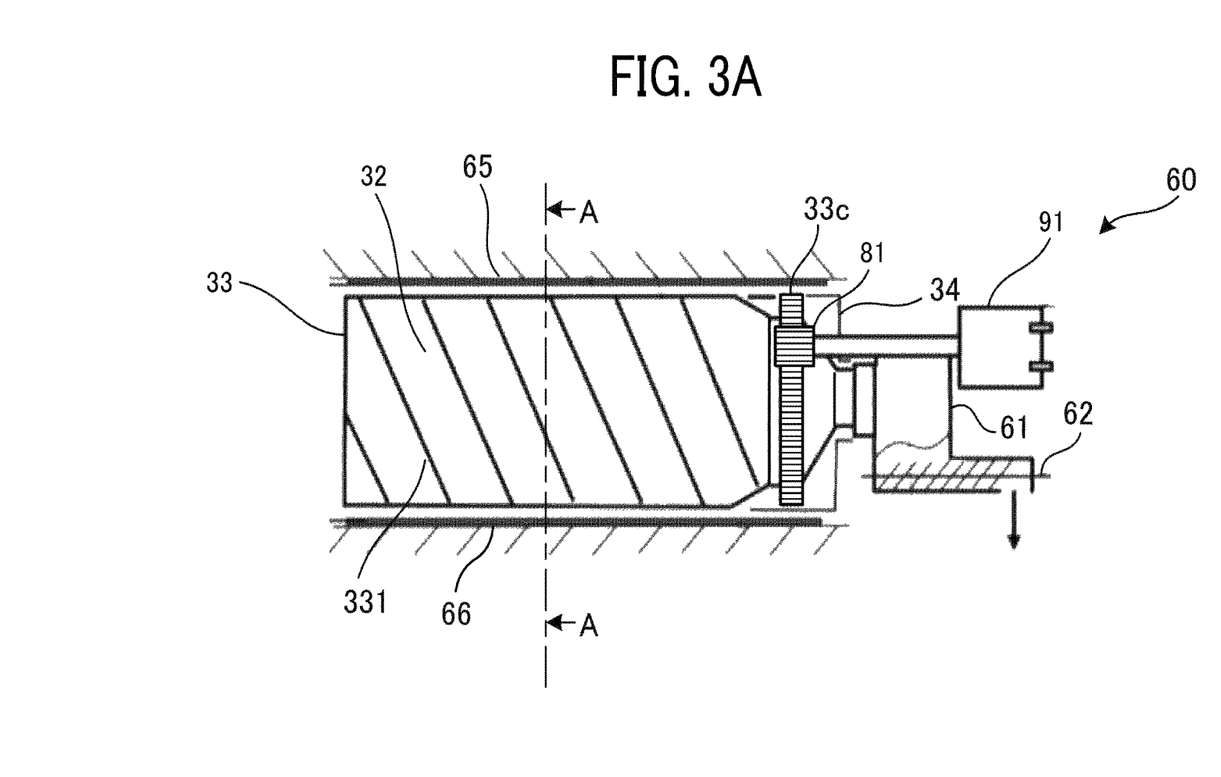
FIGS. 3A and 3B are schematic views of a toner supply device of the image forming apparatus in FIG. 1.
Figure 3B:
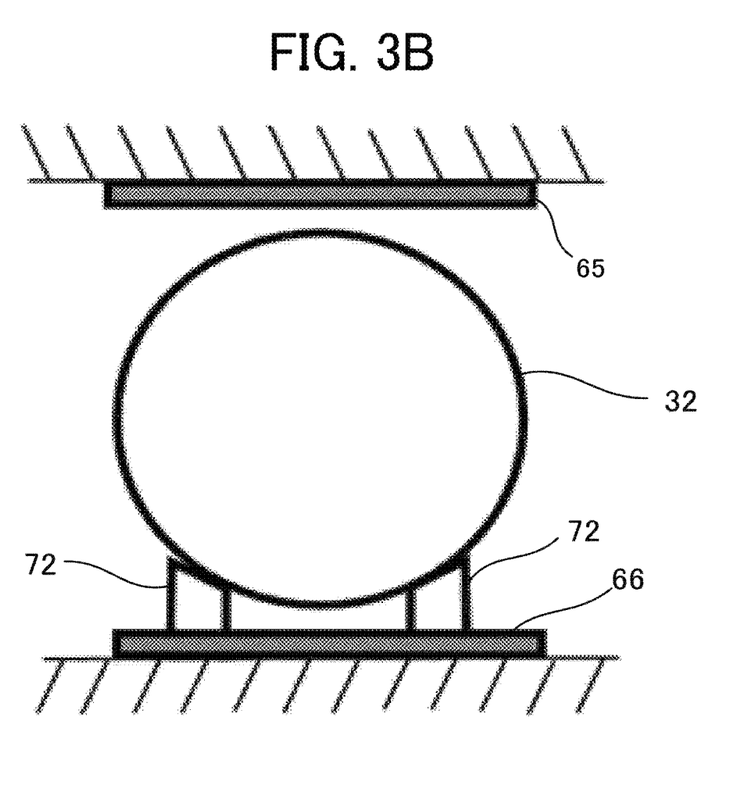

FIG. 3A is a schematic view of one of the four toner supply devices 60. FIG. 3B is a cross-sectional view along line A-A in FIG. 3A.

The toner supply device 60 supplies toner in the toner bottle 32 to the corresponding developing devices 5 as required.

The toner bottle 32 is supported by two guides 72 illustrated in FIG. 3B. The toner bottle 32 is substantially cylindrical and mainly includes a cap 34 held stationary by the toner bottle mount 70 so as not to rotate and a container body 33 formed together with a gear 33c. The container body 33 is rotatably supported so as to rotate relative to the cap 34, and the gear 33c meshes with an output gear 81 of the toner supply device 60. As a drive motor 91 rotates the output gear 81, the container body 33 is rotated via the gear 33c.

The container body 33 includes a helical rib 331 protruding inward from an inner circumference face of the container body 33. As the container body 33 rotates, the helical rib 331 transports toner contained in the container body 33 toward a hopper 61 of the toner supply device 60. Accordingly, the transported toner is discharged from the toner bottle 32 and supplied to the hopper 61. That is, the drive motor 91 rotates the container body 33 of the toner bottle 32 as required, thereby supplying the toner to the hopper 61. Any one of the toner bottle 32Y, 32M, 32C, and 32K is replaced with new one when almost all toner contained in the toner bottle 32 has been depleted.

The toner supply device 60 includes the toner bottle mount 70 (see FIG. 1), the hopper 61, a toner conveying screw 62, and the drive motor 91. The hopper 61 stores the toner supplied from the toner bottle 32, and the toner conveying screw 62 is disposed in the hopper 61.

A toner concentration sensor 56 (see FIG. 2) detects the concentration of toner in the developing device 5. As the detected toner concentration decreases, the toner conveying screw 62 is rotated in a predetermined period, thereby supplying the toner to the developing device 5. Since the toner conveying screw 62 is rotated to supply the toner, an amount of toner supplied to the developing device 5 can be calculated by detecting the number of rotations of the toner conveying screw 62.

A toner depletion sensor is disposed on a wall of the hopper 61 and detects when an amount of toner stored in the hopper 61 has fallen below a predetermined amount. As the toner depletion sensor detects that the amount of toner stored in the hopper 61 has fallen below the predetermined amount, the drive motor 91 is driven. As a result, the drive motor 91 rotates the container body 33 of the toner bottle 32 in the predetermined period, thereby supplying toner to the hopper 61.

As illustrated in FIGS. 3A and 3B, a transmitting electrode 65 and a receiving electrode 66 (also collectively referred to as "a pair of electrodes 65 and 66" or simply "electrodes 65 and 66") are disposed opposite each other via the toner bottle 32. The transmitting electrode 65 and the receiving electrode 66 cover at least the container body 33 of the toner bottle 32. The transmitting electrode 65 and the receiving electrode 66 are made of any conductive material, for example, iron plate in the present embodiment. Further, the toner bottle 32 may be divided into sections in the longitudinal direction, and a plurality of pairs of the transmitting electrode 65 and the receiving electrode 66 may be disposed in the respective sections.

In the present embodiment, a capacitance between two electrodes, the transmitting electrode 65 and the receiving electrode 66, is measured. A known method of measuring the capacitance can be used. In the present embodiment, a charging method is used in which the capacitance is measured based on a relation between the time of charging and the voltage and current while a constant voltage or a constant current is applied between a pair of electrodes. The measured capacitance varies depending on the dielectric constant between the pair of electrodes 65 and 66, and toner has a dielectric constant higher than air. Therefore, an amount of toner in the toner bottle 32 can be detected. That is, the amount of toner can be detected based on the capacitance.

The container body 33 of the toner bottle 32 discharges toner while rotating. Dimensions of the container body 33 vary and there are dimensional tolerances when the container body 33 is installed. As a result, the container body 33 rotates eccentrically. That is, the container body 33 moves up, down, left, or right while rotating. In the present embodiment, the two electrodes 65 and 66 do not contact the container body 33 and are disposed opposite each other via the container body 33. If the container body 33 is positioned between the two electrodes 65 and 66, the same capacitance can be detected even if the position of the container body 33 varies.

Figure 4A:
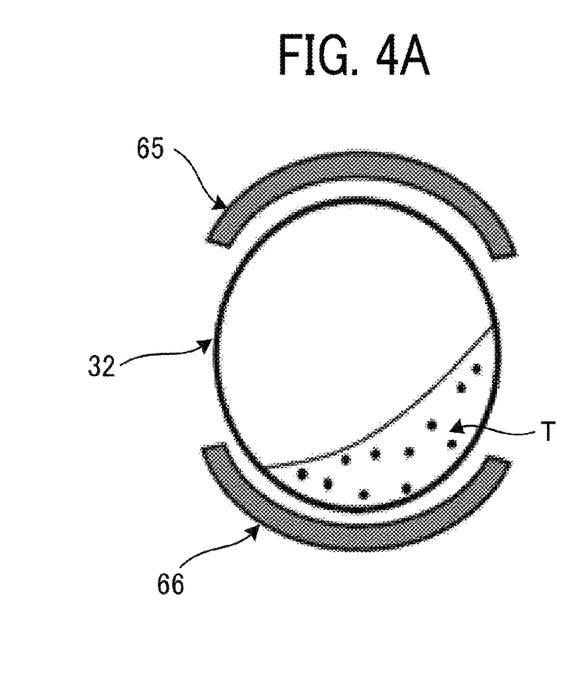
FIGS. 4A and 4B are schematic cross-sectional views illustrating an example of a toner bottle and a pair of electrodes that is arc-shaped along an outer circumference of the toner bottle according to an embodiment of the present disclosure.
Figure 4B:
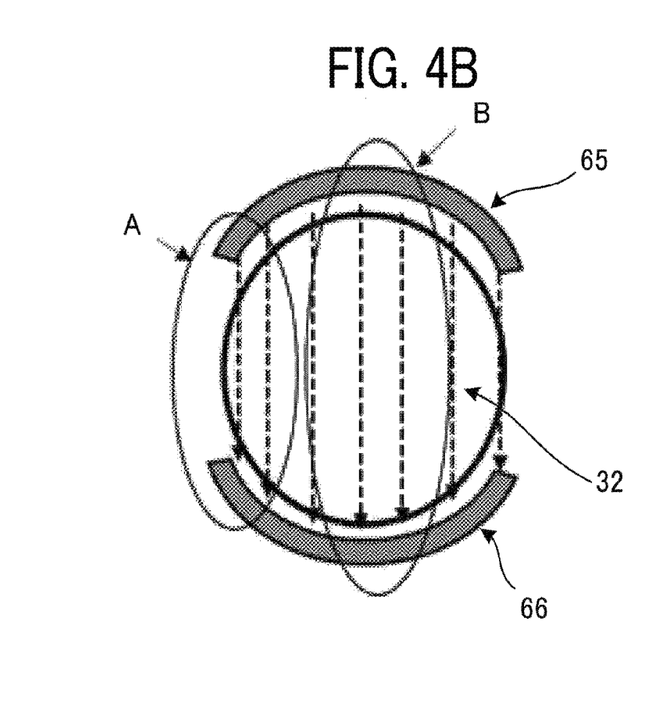

As illustrated in FIGS. 4A and 4B, the transmitting electrode 65 and the receiving electrode 66 may be arc-shaped along the shape of the toner bottle 32. However, the arc-shaped electrodes have the following disadvantages. That is, toner T in the container body 33 may be unevenly distributed as illustrated in FIG. 4A (or may not be). As illustrated in FIG. 4B, between the arc-shaped transmitting electrode 65 and receiving electrode 66, densities of lines of electric force indicated by broken lines in FIG. 4B are different in a region A at the end of the electrodes 65 and 66 and a region B in the center of the electrodes 65 and 66. Therefore, the capacitance is different when the toner T is unevenly distributed and when the toner T is evenly distributed. In the present embodiment, the transmitting electrode 65 and the receiving electrode 66 are parallel flat plates as illustrated in FIG. 3B to detect a constant value of the capacitance regardless of toner distribution.

Figure 5:
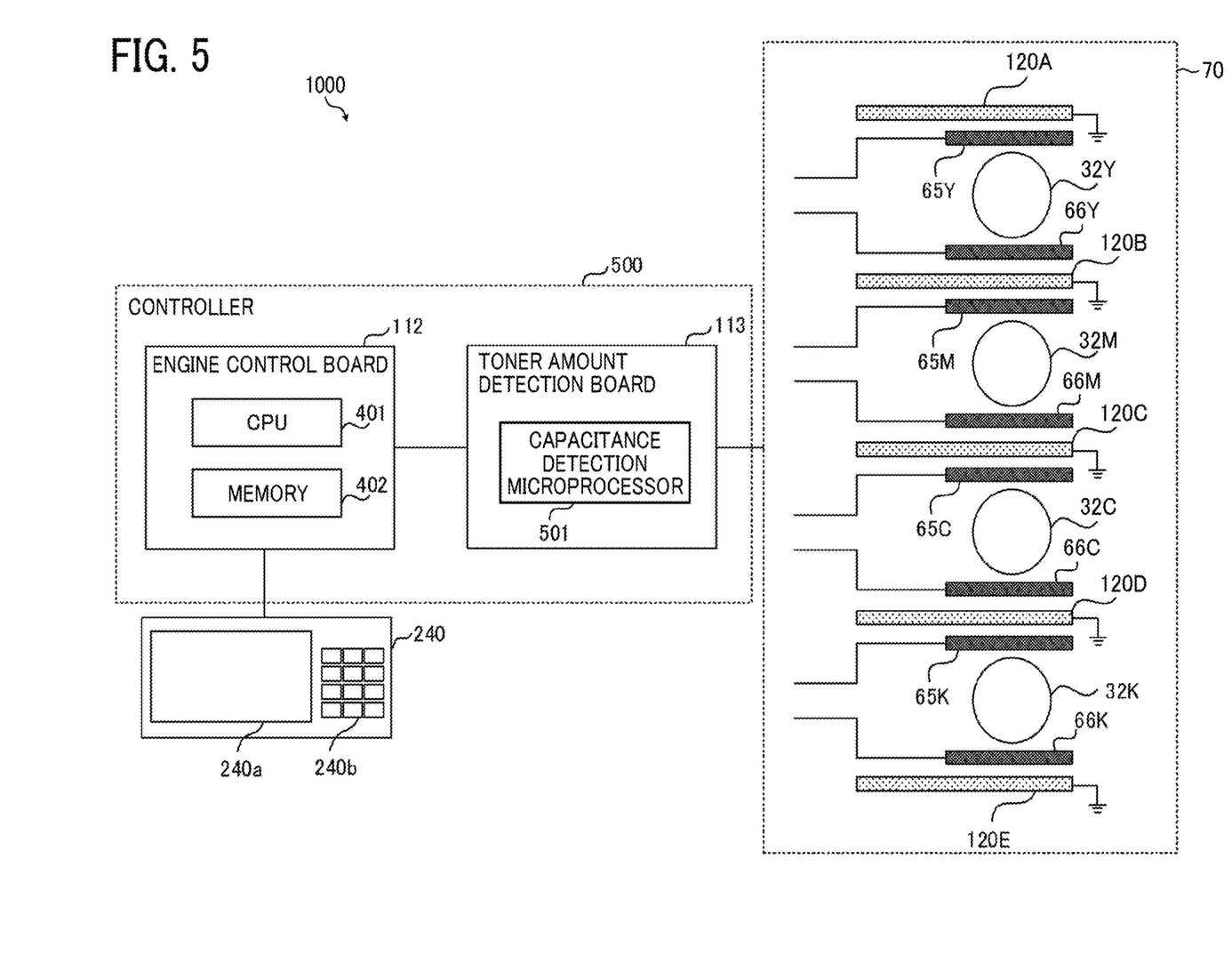
FIG. 5 is a block diagram illustrating a configuration of a toner amount detector according to an embodiment of the present disclosure.

FIG. 5 is a block diagram illustrating a configuration of a toner amount detector 1000 that detects the capacitance between the transmitting electrode 65 and the receiving electrode 66 and derives the amount of toner based on the capacitance. The toner amount detector 1000 includes an engine control board 112, a toner amount detection board 113, a control panel 240, transmitting electrodes 65Y, 65M, 65C, and 65K, receiving electrodes 66Y, 66M, 66C, 66K, and guard members 120A, 120B, 120C, 120D, and 120E. The configuration including the engine control board 112 and the toner amount detection board 113 is referred to as a controller 500.

The transmitting electrode 65 and the receiving electrode 66 (hereinafter, the suffixes indicating the color of toner are omitted as appropriate) are disposed opposite each other so as to sandwich the toner bottle 32 for each color therebetween. The guard members 120B to 120D are disposed between units including the toner bottle 32, the transmitting electrode 65, and the receiving electrode 66 so that the guard members 120B to 120D face the corresponding electrodes 65 and 66. The guard member 120A is disposed so as to face the transmitting electrode 65Y, and the guard member 120E is disposed so as to face the receiving electrode 66K. Thus, the guard members 120A to 120E are disposed outboard of the pair of electrodes 65 and 66. The guard members 120A to 120E are identical except for the arrangement thereof, and are therefore appropriately referred to as the guard member 120.

The toner amount detection board 113 is a printed circuit board including a capacitance detection microprocessor 501 to detect the capacitance between the transmitting electrode 65 and the receiving electrode 66 and calculate the amount of toner remaining in the toner bottle 32 based on the detected capacitance. The toner amount detection board 113 is connected to the engine control board 112 by serial communication, and further connected to the transmitting electrode 65 and the receiving electrode 66 for each color.

The engine control board 112 is a printed circuit board including a central processing unit (CPU) 401 as an arithmetic processor and a memory 402 such as a main memory and an auxiliary memory. The engine control board 112 switches control between a mutual capacitance method and a self-capacitance method described later.

The control panel 240 includes a display panel 240a and an operation panel 240b. The display panel 240a such as a touch panel displays a current setting data, a selection screen, and the like, and accepts an input from an operator. The operation panel 240b includes a numeric keypad that receives setting data of image forming conditions such as density setting conditions, a start key for receiving a copy start instruction, and the like.

The guard member 120 partitions adjacent toner bottles 32. Without the guard member 120, some lines of electric force between the transmitting electrodes 65 and the receiving electrode 66 may be changed due to the toner in the adjacent toner bottles 32, thereby hindering accurate detection of the amount of toner in the target toner bottle 32. As illustrated in FIG. 5, since the guard member 120 partitions the adjacent toner bottles 32, the lines of electric force between the transmitting electrodes 65 and the adjacent receiving electrode 66 are cut off by the guard member 120. That is, some of the lines of electric force between the transmitting electrodes 65 and the adjacent receiving electrode 66 are directed toward the guard member 120 but does not cross over the guard member 120.

The mutual capacitance method and the self-capacitance method are described below with reference to FIGS. 6 and 7.

Figure 6:
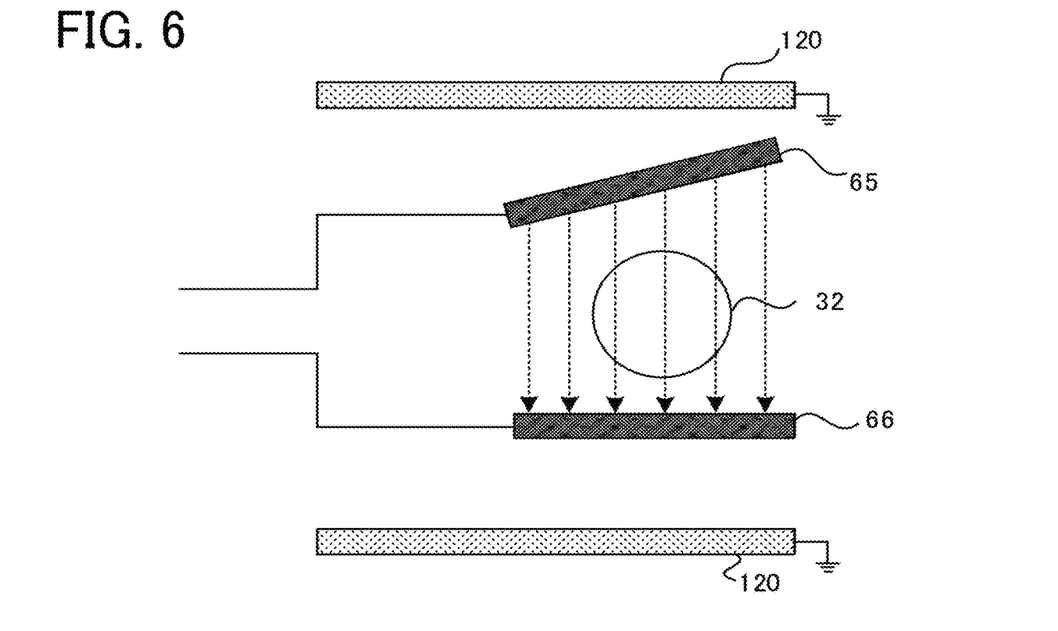
FIG. 6 is a schematic view illustrating a mutual capacitance method according to an embodiment of the present disclosure.

The mutual capacitance method is a method of detecting the capacitance between the transmitting electrode 65 and the receiving electrode 66, which is the pair of electrodes, as described above, for example, by the above-described charging method as illustrated in FIG. 6.

Figure 7:
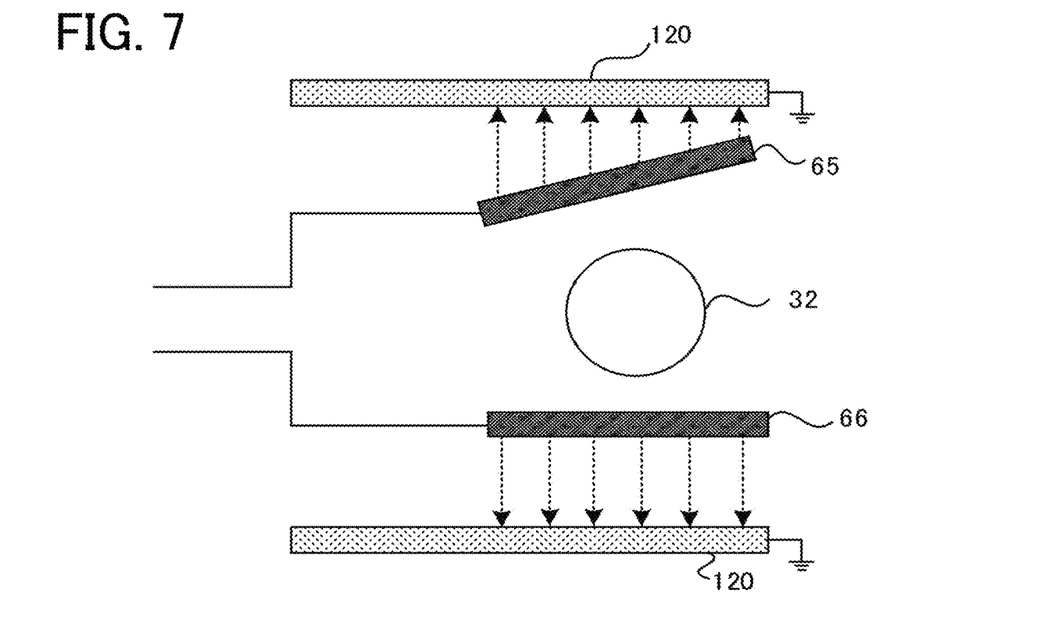
FIG. 7 is a schematic view illustrating a self-capacitance method according to an embodiment of the present disclosure.

On the other hand, the self-capacitance method is a method of detecting the capacitance between the transmitting electrode 65 and the guard member 120, and the capacitance between the receiving electrode 66 and the guard member 120 as illustrated in FIG. 7. In the self-capacitance method, the capacitance is detected by, for example, the charging method as in the mutual capacitance method. Note that, in the present embodiment, the guard member 120 is connected to the toner amount detection board 113 and has the same potential as the ground (GND) of the toner amount detection board 113. Therefore, an additional electrode or the like is not required in the guard member 120, and the capacitance between each of the electrodes 65 and 66 and the guard member 120 (i.e., GND) can be acquired by the guard member 120 serving as a ground electrode.

FIGS. 6 and 7 illustrate a state in which the transmitting electrode 65 is deviated from a normal position and the electrodes 65 and 66 are not parallel to each other. The capacitance is inversely proportional to the distance between the electrodes 65 and 66 (or the distance between the electrode 65 or 66 and the guard member 120), and is proportional to the area of the electrodes 65 and 66 facing each other. For this reason, when a positional deviation occurs such that the electrodes become closer to each other in part, the acquired capacitance increases. Conversely, when the positional deviation occurs in the direction in which the electrodes separate away from each other, the acquired capacitance decreases. Further, when a positional deviation occurs in the lateral direction, the area of the electrodes facing each other is reduced, so that the capacitance decreases.

In the case in which such a positional deviation has occurred, the detection result (the capacitance between the transmitting electrode 65 and the receiving electrode 66) by the mutual capacitance method is not accurate. However, in a comparative apparatus, when the amount of toner can be detected, the detected value is treated as a correct value regardless of the positional deviation.

Figure 8:
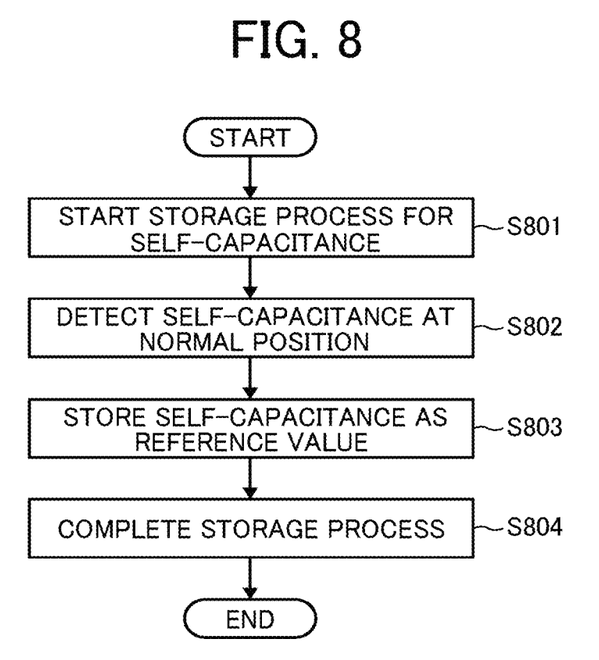
FIG. 8 is a flowchart illustrating an example of a process of acquiring a reference value of self-capacitance according to an embodiment of the present disclosure.
Figure 9:
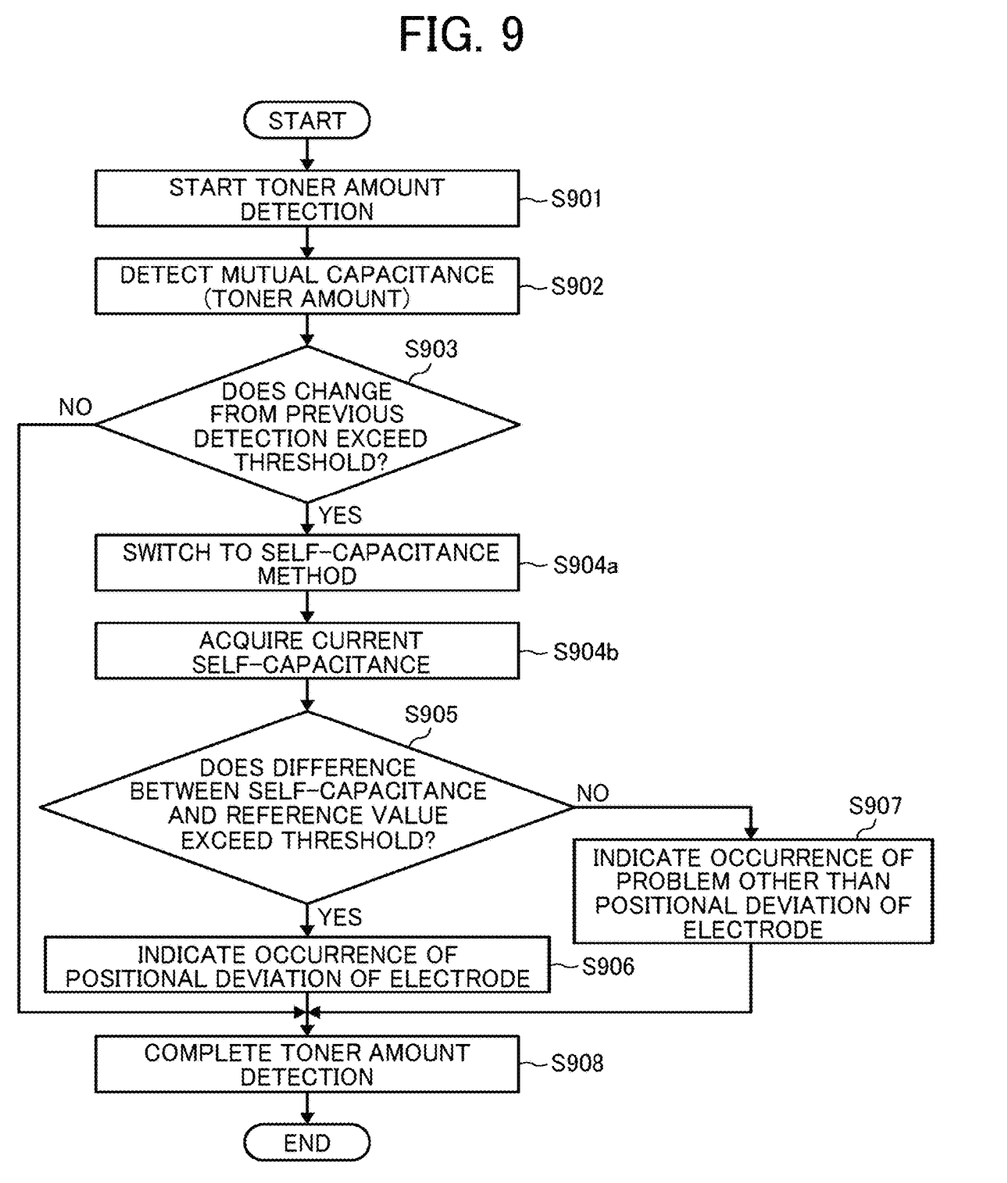
FIG. 9 is a flowchart of an example of a process of detecting an amount of toner according to an embodiment of the present disclosure.

A description is provided of an example of operation for detecting the positional deviation of the electrodes 65 and 66 with reference to flowcharts illustrated in FIGS. 8 and 9.

FIG. 8 is a flowchart illustrating an example of a process of acquiring a reference capacitance between the electrode 65 or 66 and the guard member 120 by the self-capacitance method. The process in the flowchart in FIG. 8 is executed when the electrodes 65 and 66 are disposed at a normal position, for example, before product shipment.

The toner amount detection board 113 operates the capacitance detection microprocessor 501 in accordance with a command from the engine control board 112 to start a storage process for self-capacitance (S801) and detects the capacitance at the normal position by the self-capacitance method (S802). Here, the value of the capacitance by the self-capacitance method is referred to as "self-capacitance value". At that time, the toner amount detection board 113 sequentially detects the capacitance between the transmitting electrode 65Y and the guard member 120A, the capacitance between the receiving electrode 66Y and the guard member 120B, the capacitance between the transmitting electrode 65M and the guard member 120B, and the like. Finally, the toner amount detection board 113 detects the capacitance between the receiving electrode 66K and the guard member 120E. That is, the capacitances are detected between all the electrodes 65 or 66 and all the guard members 120 facing the corresponding electrodes 65 or 66.

The engine control board 112 acquires all the self-capacitance values detected by the toner amount detection board 113 and stores in the memory 402 (S803) and completes the storage process (S804). In the following description, the self-capacitance value stored here is used as a reference value, and thus the self-capacity value is referred to as a "reference self-capacitance value".

FIG. 9 is a flowchart of an example of a process of detecting an amount of toner according to the present embodiment. The process in the flowchart in FIG. 9 is repeatedly executed at predetermined time intervals when the printer 100 is in operation.

In the toner amount detection board 113, the capacitance detection microprocessor 501 operates in accordance with a command from the engine control board 112 to start toner amount detection (S901) and detects the capacitance between the transmitting electrode 65 and the receiving electrode 66 by the mutual capacitance method (S902). The amount of toner is detected based on the detected capacitance. The toner amount detection board 113 may treat the detected capacitance as the amount of toner as it is. Alternatively, the amount of toner may be derived from the detected capacitance by using a mechanism provided in advance for converting the capacitance to the amount of toner (e.g., a function or a correspondence table). Here, all the capacitances for respective colors are detected.

The engine control board 112 acquires the current detection value (the capacitance or the amount of toner) detected in S902 from the toner amount detection board 113 and temporarily stores the current detection value in the memory 402. Then, the engine control board 112 acquires the previous detection value temporarily stored in the memory 402 and compares the current detection value detected in S902 with the previous detection value. Then, the engine control board 112 determines whether the detection value has changed by a predetermined threshold amount or more (S903). For example, the engine control board 112 determines whether or not the current detection value exceeds a range of ±35% of the previous detection value. If the detection value has not changed by the predetermined threshold amount or more (No in S903), the process in the flowchart in FIG. 9 proceeds to step S908 to complete the toner amount detection.

If the detection value has changed by the predetermined threshold amount or more, that is, the detection value (detected capacitance) is abnormal (Yes in S903), the engine control board 112 switches from the mutual capacitance method to the self-capacitance method (S904a). Then, the engine control board 112 instructs the toner amount detection board 113 to acquire the current self-capacitance value (S904b). In response to this instruction, the toner amount detection board 113 detects the capacitance between the transmitting electrode 65 and the guard member 120 and the capacitance between the receiving electrode 66 and the guard member 120 (i.e., self-capacitance value). At that time, the self-capacitance values for all colors between all the electrodes 65 or 66 and all the guard members 120 facing the corresponding electrodes 65 or 66 may be detected. Alternatively, the self-capacitance values for only the colors whose detection value have changed by the predetermined threshold value or more may be detected.

The engine control board 112 acquires the self-capacitance value detected by the toner amount detection board 113, compares the self-capacitance value with the reference self-capacitance value stored in the memory 402, and determines whether the current self-capacitance value has changed by the predetermined threshold amount or more, for example, ±35% or more of the reference self-capacitance value (S905). When the positional deviation of the electrodes 65 and 66 does not occur, the self-capacitance value remains constant. However, when the electrode 65 or 66 is deviated upward, downward, leftward, or rightward, or when the electrode 65 or 66 is inclined, the difference between the current self-capacitance value and the reference self-capacitance value is generated. Here, the positional deviation includes the case in which the electrode is inclined.

If the difference is equal to or greater than the predetermined threshold amount (Yes in S905), the engine control board 112 determines that the positional deviation of the electrodes 65 and 66 has occurred and displays a message reporting occurrence of the positional deviation on the control panel 240 (S906). On the other hand, when the difference is less than the predetermined threshold amount (No in S905), the engine control board 112 determines that a problem other than the positional deviation of the electrodes 65 and 66 has occurred and displays a message reporting the problem on the control panel 240 (S907).

One or both of the predetermined thresholds used in S903 and S905 can be set by a user. That is, the control panel 240 accepts a value (parameter) input by the user and store the value (parameter) as the predetermined threshold amount in the memory 402. By changing the predetermined threshold amount according to the printer model (apparatus configuration), seasonal environment changes, and the like, the determination can be made with high accuracy.

In the above-described embodiments, when the capacitance acquired by the mutual capacitance method is abnormal, the operation is switched to the self-capacitance method to detect the positional deviation of the electrodes. Alternatively, the detection by the self-capacitance method may be performed periodically to continuously monitor the positional deviation of the electrodes regardless of the capacitance acquired by the mutual capacitance method. The periodical detection of the positional deviation of the electrodes at predetermined time intervals can reduce the time to recognize the positional deviation. It is to be noted that both of the following two operations may be performed in the image forming apparatus: switching from the mutual capacitance method to the self-capacitance method and detecting the positional deviation of the electrodes, and detecting the positional deviation of the electrodes periodically by the self-capacitance method.

A grounding member corresponds to the guard member 120 of the above-described embodiments. Circuitry corresponds to the controller 500 (the engine control board 112 and the toner amount detection board 113) of the above-described embodiments. An indicator and an input device correspond to the control panel 240 of the above-described embodiments. A first detection processing corresponds to step S902, and a second detection processing corresponds to steps S904b to S905 according to the above-described embodiments.

Each of the functions of the above-described embodiments may be implemented by one or more processing circuits or circuitry. Here, the "board (circuitry)" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit components arranged to perform the recited functions.

As described in the above embodiments, the positional deviation of the electrodes from the normal position can be detected and the detection result can be indicated. As a result, according to the present disclosure, an amount of toner in normal times can be detected excluding effects of problem such as the positional deviation, thereby improving the accuracy of detecting the amount of toner.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations of the above-described methods may be performed in various other ways, for example, in an order different from that described above.

What is claimed is:

1. A toner amount detector configured to detect an amount of toner in a toner bottle, the toner amount detector comprising:
   at least one pair of electrodes disposed opposite each other via the toner bottle;
   grounding members disposed outboard of the at least one pair of electrodes and electrically grounded, the grounding members facing the at least one pair of electrodes, respectively;
   circuitry configured to switch a first detection processing and a second detection processing, the first detection processing to detect the amount of toner based on a first capacitance between the at least one pair of electrodes, the second detection processing to detect a positional deviation of the at least one pair of electrodes based on a second capacitance between each of the grounding members and a corresponding one of the at least one pair of electrodes; and
   an indicator configured to indicate that the positional deviation has occurred.

2. The toner amount detector according to claim 1, wherein the circuitry is configured to determine whether the first capacitance acquired by the first detection processing is abnormal based on the first capacitance previously acquired by the first detection processing and the first capacitance currently acquired by the first detection processing.

3. The toner amount detector according to claim 2, wherein the circuitry is configured to switch from the first detection processing to the second detection processing when the first capacitance acquired by the first detection processing is abnormal.

4. The toner amount detector according to claim 2, further comprising an input device configured to accept a parameter to determine that the first capacitance is abnormal in the first detection processing and a parameter to determine that the positional deviation has occurred in the second detection processing.

5. The toner amount detector according to claim 1, wherein the circuitry is configured to execute the second detection processing based on comparison of the second capacitance in a state in which the at least one pair of electrodes is disposed in a normal position and the second capacitance currently acquired.

6. The toner amount detector according to claim 1, wherein the circuitry is configured to execute the second detection processing periodically at predetermined time intervals.

7. The toner amount detector according to claim 1, wherein the first detection processing is a mutual capacitance method, and the second detection processing is a self-capacitance method.

8. A toner amount detection method of detecting an amount of toner in a toner bottle disposed between at least one pair of electrodes facing grounding members disposed outboard of the at least one pair of electrodes and electrically grounded, the method comprising:
switching a first detection processing and a second detection processing;
detecting the amount of toner based on a first capacitance between the at least one pair of electrodes in the first detection processing; and
detecting a positional deviation of the at least one pair of electrodes based on a second capacitance between each of the grounding members and a corresponding one of the at least one pair of electrodes in the second detection processing.

9. The toner amount detection method according to claim 8, further comprising determining whether the first capacitance acquired by the first detection processing is abnormal based on the first capacitance previously acquired by the first detection processing and the first capacitance currently acquired by the first detection processing.

10. The toner amount detection method according to claim 9,
wherein the switching is to switch from the first detection processing to the second detection processing when the first capacitance acquired by the first detection processing is abnormal.

11. The toner amount detection method according to claim 9, further comprising accepting a parameter to determine that the first capacitance is abnormal in the first detection processing and a parameter to determine that the positional deviation has occurred in the second detection processing.

12. The toner amount detection method according to claim 8, further comprising executing the second detection processing based on comparison of the second capacitance in a state in which the at least one pair of electrodes is disposed in a normal position and the second capacitance currently acquired.

13. The toner amount detection method according to claim 8, further comprising executing the second detection processing periodically at predetermined time intervals.

14. The toner amount detection method according to claim 8,
wherein the first detection processing is a mutual capacitance method, and the second detection processing is a self-capacitance method.

15. A non-transitory storage medium storing a program code which, when executed by one or more processors, causes the one or more processors to perform a method of detecting an amount of toner in a toner bottle disposed between at least one pair of electrodes facing grounding members disposed outboard of the at least one pair of electrodes and electrically grounded, the method comprising:
switching a first detection processing and a second detection processing;
detecting the amount of toner based on a first capacitance between the at least one pair of electrodes in the first detection processing; and
detecting a positional deviation of the at least one pair of electrodes based on a second capacitance between each of the grounding members and a corresponding one of the at least one pair of electrodes in the second detection processing.

16. The non-transitory storage medium according to claim 15,
wherein the method includes determining whether the first capacitance acquired by the first detection processing is abnormal based on the first capacitance previously acquired by the first detection processing and the first capacitance currently acquired by the first detection processing.

17. The non-transitory storage medium according to claim 16,
wherein the switching is to switch from the first detection processing to the second detection processing when the first capacitance acquired by the first detection processing is abnormal.

18. The non-transitory storage medium according to claim 16,
wherein the method includes accepting a parameter to determine that the first capacitance is abnormal in the first detection processing and a parameter to determine that the positional deviation has occurred in the second detection processing.

19. The non-transitory storage medium according to claim 15,
wherein the method includes executing the second detection processing based on comparison of the second capacitance in a state in which the at least one pair of electrodes is disposed in a normal position and the second capacitance currently acquired.

20. The non-transitory storage medium according to claim 15,
wherein the method includes executing the second detection processing periodically at predetermined time intervals.

* * * * *